Figure 1:
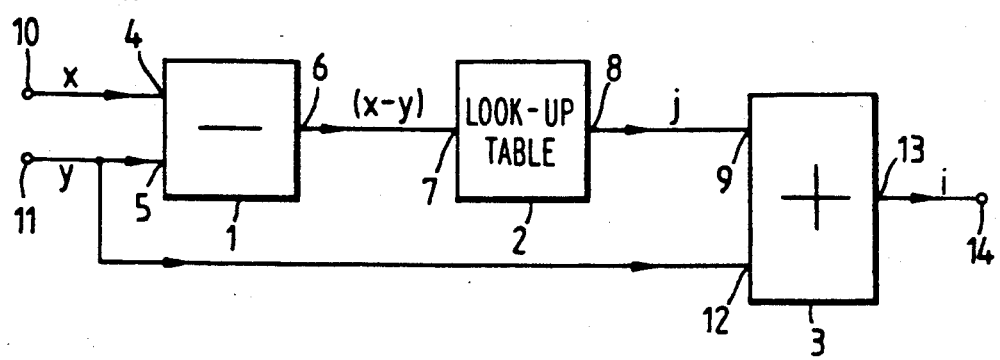

//  # United States Patent [19]

Burgess et al.

[11] Patent Number: 4,994,994
[45] Date of Patent: Feb. 19, 1991

[54] APPARATUS PERFORMING MODULO P ADDITION, WHERE OPERANDS ARE EXPRESSED AS POWERS OF A GENERATOR, USING A REDUCED SIZE ZECH LOOK-UP TABLE

[75] Inventors: Ian A. Burgess, Horley; Christopher B. Marshall, Lindfield, both of England

[73] Assignee: U.S. Philips Corporation, New York, N.Y.

[21] Appl. No.: 345,392

[22] Filed: May 1, 1989

[30] Foreign Application Priority Data

Apr. 29, 1988 [GB] United Kingdom ............... 8810165

[51] Int. Cl.$^5$ .............................................. G06F 7/72
[52] U.S. Cl. .................................................. 364/746
[58] Field of Search .............................. 364/746, 746.1

[56] References Cited

U.S. PATENT DOCUMENTS 4,742,479 5/1988 Kloker et al. ...................... 364/746

OTHER PUBLICATIONS

Bliss, "Table Lookup Residue Adder", *IBM Tech. Disclosure Bulletin*, vol. 11, No. 8, Jan. 1969, pp. 1017–1018.
S. S. Yau et al., "On the Design of Modulo Arithmetic Units Based on Cyclic Groups", IEEE Trans. Computers, vol. C-25, No. 11, 11/76, pp. 1057–1067.
G. A. Jullien, "Implementation of Multiplication Modulo a Prime Number ...", IEEE Trans. Computers, vol. C-29, No. 10, 10/80, pp. 899–905.
F. J. MacWilliams, *The Theory of Error-Correcting Codes*, (North Holland, 1978), pp. 91–92.

*Primary Examiner*—David H. Malzahn
*Attorney, Agent, or Firm*—Anne E. Barschall

[57] ABSTRACT

In a modulo p arithmetic apparatus operands are represented as powers of a generator so that multiplications can be performed as simple additions. However, this makes actual addition difficult. Additions are therefore performed by means of a modulo (p-1) subtractor circuit (1), a Zech table (2) and a modulo (p-1) adder circuit (3). In order to reduce the size of the Zech table which would otherwise be required, specific values of the output of the subtractor circuit are converted to their negatives modulo (p-1) by means of a converter circuit (15) prior to their application to the Zech table, making use of the fact that each negative modulo (p-1) maps directly to a unique positive number which is often different from the number which was originally converted. For each number which is converted a multiplexer (18), which normally feeds that input operand (y) which is subtracted in the subtractor circuit to one input (12) of the adder circuit, is switched to feed the other input operand (x) to the adder circuit instead.

5 Claims, 2 Drawing Sheets

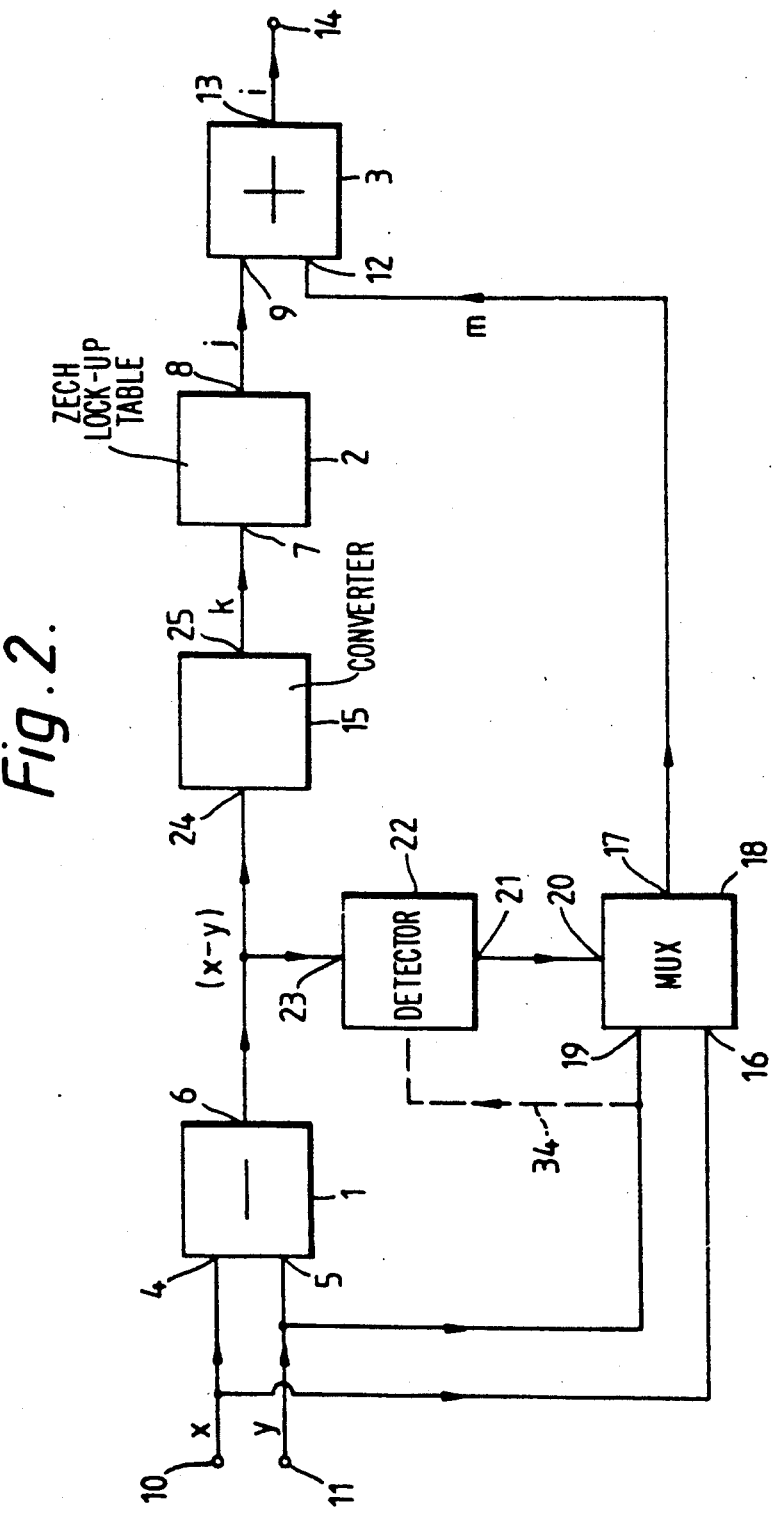

APPARATUS PERFORMING MODULO P ADDITION, WHERE OPERANDS ARE EXPRESSED AS POWERS OF A GENERATOR, USING A REDUCED SIZE ZECH LOOK-UP TABLE

This invention relates to apparatus for generating a representation modulo (p-1) of the power index i to which a generator g has to be raised to give the value (X+Y) in modulo p arithmetic in response to the application to said apparatus of representations modulo (p-1) of x, where $g^x = X$, and y, where $g^y = Y$, which apparatus has first and second inputs for the representations of x and y respectively and an output for the representation of i- and comprises a subtractor circuit to first and second inputs of which the first and second inputs respectively of the apparatus are coupled, for generating a representation modulo (p-1) of (x−y) at an output thereof, a look-up table circuit having an input coupled to the output of the subtractor circuit, for generating at an output thereof a representation modulo (p-1) of the power index j to which g has to be raised to give the value $g^k+1$ in modulo p arithmetic in response to the application to said input of a representation modulo (p-1) of any member of a set of values of (k), and an adder circuit having first and second inputs to which are coupled the second input of the arrangement and the output of the look-up table circuit respectively, for generating at an output thereof a representation modulo (P-1) of m+j in response to the application to its first and second inputs of representations modulo (p-1) of m and j respectively, which output constitutes the output of the arrangement.

Apparatus of the above kind is discussed, for example, on pages 91–92 of the book "The Theory of Error-Correction Codes", Part 1, by F.J. MacWilliams and N.J.A. Sloane (North-Holland Publishing Company. 1977).

The computation of the arithmetical sum of input quantities tends to be a simpler and faster process than the computation of their arithmetical product, and this fact has given rise to such expedients as the use of logarithms whereby a multiplication or division operation is transformed into an addition operation or a subtraction operation respectively, albeit at the expense of necessitating the initial conversion of the input quantities to their logarithms and the final conversion of the output to its antilogarithm. If the basic arithmetic is carried out in the residue number system (RNS) then, as is known from e.g. the article "On the Design of Modulo Arithmetic Units Based on Cyclic Groups" by S. S. Yau and J. Chung in I.E.E.E. Trans. on Computers Vol. C-25 No. 11 (Nov. 1976) and the article "Implementation of Multiplication, Modulo a Prime Number, with Applications to Number Theoretic Transforms" by G. A. Jullien, in I.E.E.E. Trans. on Computers. Vol C-29 No. 10 (Oct. 1980), a multiplication operation modulo p where p is a prime number or a power of a prime number maps into a modulo (p-1) addition. In other words the "logarithms" of the modulo p basic input operands (respective powers of a generator g where g is the $(p-1)^{th}$ root of unity, i.e. $g(p^{-1}) = 1$ mod p) are themselves modulo (p-1). Thus, as a simple example, if the basic arithmetic is carried out in an RNS channel modulo 13 (for which g = 2) the basic input operands may be initially converted to their "logarithms" according to the following table.

| Input operand n | "Logarithm" x (where $g^x$ mod 13 = n) |
|---|---|
| 1 | 0 |
| 2 | 1 |
| 3 | 4 |
| 4 | 2 |
| 5 | 9 |
| 6 | 5 |
| 7 | 11 |
| 8 | 3 |
| 9 | 8 |
| 10 | 10 |
| 11 | 7 |
| 12 | 6 |

Then a multiplication operation may he carried out on say, two modulo 13 input operands $n_1$ and $n_2$ by adding together the corresponding values of x modulo 12 and looking up the value of n corresponding to the result. For example, in order to multiply 3 by 5 one adds 4 and 9 modulo 12 to give 1 mod 12. From the table x =1 corresponds to n =2, which is 15 mod 13 as required. Many computations, however, comprise a mixture of multiplication/division and addition/subtraction, and once conversion to logarithms has been effected addition/subtraction becomes difficult unless it is preceded by the taking of antilogarithms (with the possible consequence that it has also to be succeeded by the taking of logarithms once again) thereby at least partly nullifying the advantages obtained by the taking of logarithms in the first place. In order to mitigate this disadvantage, at least when the computation is carried out in a Galois field, it is known from e.g. pages 91–92 of the book quoted above to make use of the process/apparatus illustrated in block diagrammatic form in FIG. 1 of the accompanying drawings. A representation of an output quantity i, where $g^i = X + Y$ and g is a generator, is generated from representations of input quantities x and y, where $g^x = X$ and $g^y = Y$, by means of a subtractor 1, a look-up table 2. and an adder 3, thereby in effect performing an addition operation while maintaining the input and output quantities in logarithmic form so that the taking of "antilogarithms" need only be carried out at the end of the overall calculation. More particularly, the representations of the input quantities x and y are applied via inputs 10 and 11 respectively to inputs 4 and 5 respectively of the subtractor 1 the output 6 of which is connected to the input 7 of the look-up table 2. The output 8 of the look-up table 2 is connected to the input 9 of the adder 3 a second input 12 of which is connected to the input terminal 11 and is hence fed with the representation of the input quantity y. The output 13 of adder 3 is connected to the apparatus output 14. Subtractor 1 generates a representation of the quantity (x−y) at its output 6. Look-up table 2 is a so-called Zech table and generates, when a representation of the quantity (x−y) is applied to its input 7, a representation of the quantity j at its output 8, where $g^j = g^{x-y}+1$. Adder 3 generates a representation of the quantity i=y+j at its output 13. It will be noted that $g^i = g^{y+j} = g^y g^j = g^y(g^{x-y}+1) = g^x = g^y = X+Y$ as required, and that this result has been obtained by means of one subtraction operation, one addition operation and one look-up operation. As an example, for modulo 13 basic arithmetic and with g=2 the Zech table is the following

| Input (x − y) | $g^{x-y}$ | $g^{x-y}+1$ | Output j |
|---|---|---|---|
| Nil | 0 | 1 | 0 |
| 0 | 1 | 2 | 1 |
| 1 | 2 | 3 | 4 |
| 2 | 4 | 5 | 9 |
| 3 | 8 | 9 | 8 |
| 4 | 3 | 4 | 2 |
| 5 | 6 | 7 | 11 |
| 6 | 12 | 0 | Nil |
| 7 | 11 | 12 | 6 |
| 8 | 9 | 10 | 10 |
| 9 | 5 | 6 | 5 |
| 10 | 10 | 11 | 7 |
| 11 | 7 | 8 | 3 |

(The entries "Nil" indicate the special state that corresponds to a number zero, which cannot be represented in the form $g^n$ and has to be represented differently.)

It will be appreciated that, in principle, the size of the Zech table required is directly proportional to the size of the modulus p employed, which can result in large and complex Zech tables with large values of p. It is an object of the present invention to mitigate this disadvantage.

According to the invention apparatus as defined in the first paragraph is characterised in that the apparatus further includes (a) a multiplexer circuit having a first input, a second input, a control input and an output, which multiplexer circuit is controllable by the application of a control signal to said control input to couple its first input to its output and its second input to its output as alternatives, said first input being coupled tot he first input of the arrangement and the coupling from the second input of the arrangement to the first input of the adder circuit being through said multiplexer circuit from its second input to its output (b) a converter circuit included in the coupling from the output of the subcontractor circuit to the input of the look-up table circuit for converting each representation of at least one specific value of (x−y) generated by the subtractor circuit to a representation modulo (p−1) of (y−x), and (c) a coupling from the output of the subtractor circuit to the control input of the multiplexer circuit for controlling the multiplexer circuit to couple its first input to its output in response at least to the presence at the subtractor circuit output of any representation which will be so converted by the converter circuit.

It has now been recognised that provision of a multiplexer circuit, a converter circuit, and a coupling from the output of the subtractor circuit to the control input of the multiplexer circuit in the manner specified enables the size of the Zech look-up table circuit which would otherwise be required to be reduced, as will become apparent hereinafter.

Unless special steps are taken, apparatus of the kind specified in the first paragraph will not in general respond to the correct manner to a value of y which corresponds to Y=0. In order that a correct response can be obtained in an economical manner in an apparatus in accordance with the present invention, preferably the apparatus includes means for also controlling the multiplexer circuit to couple its first input to its output in response to the presence at the second input of the arrangement of a representation of a specific value of y corresponding to Y=0.

Figure 3:
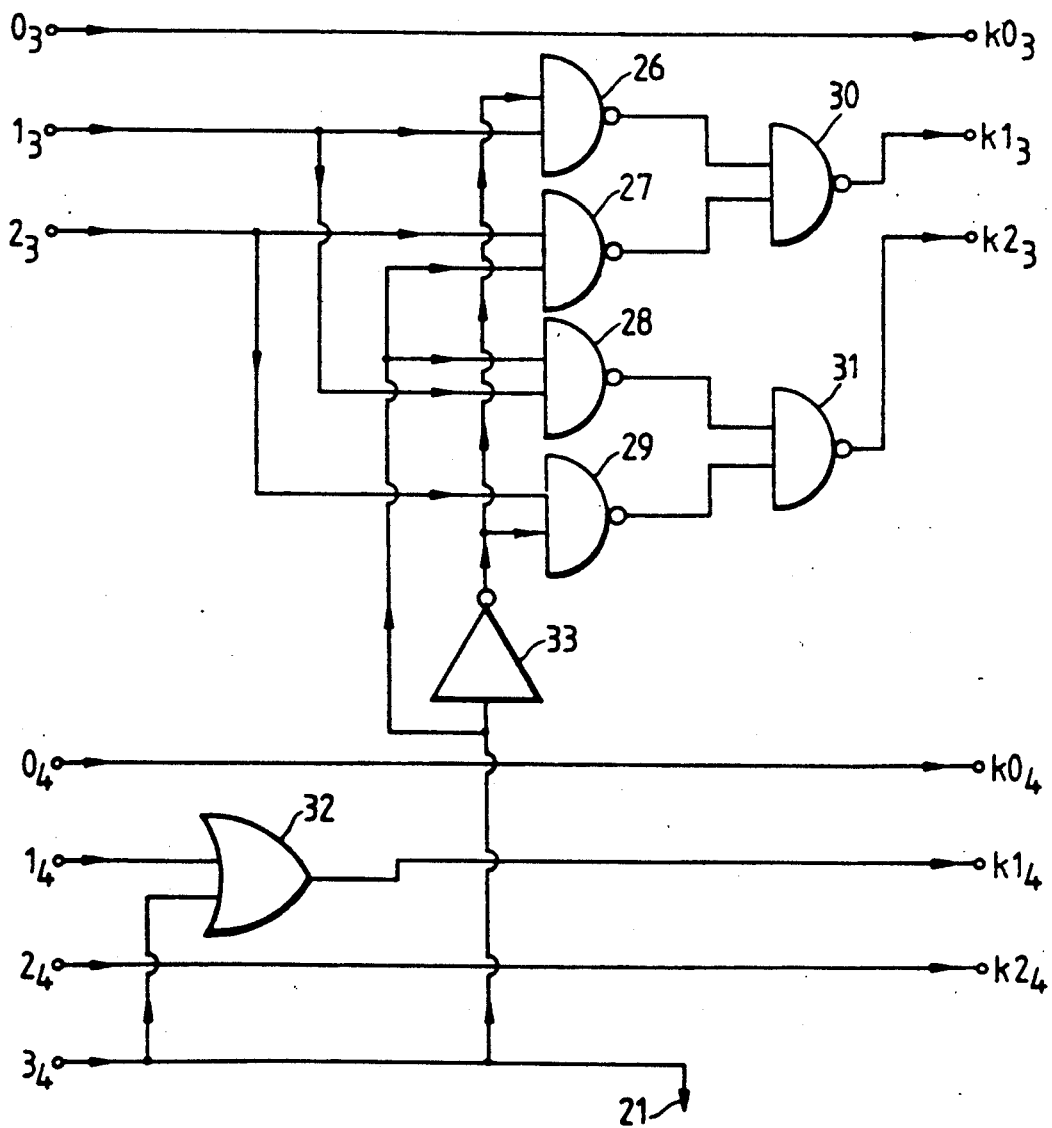

Embodiments of the invention will now be described, by way of example, with reference to the accompanying diagrammatic drawings in which FIG. 1 is a block diagram of a known apparatus, as discused hereinbefore, FIG. 2 is a block diagram of an embodiment of the invention, and FIG. 3 shows a possible construction for one of the blocks of FIG. 2.

FIG. 2 shows apparatus for generating at an output 14 a representation modulo (p-1) of the power index i to which a generator g has to be raised to give the value (X+Y)in modulo p arithmetic in response to the application to inputs 10 and 11 of the apparatus of representations modulo (p-1) of x and y respectively, where $g^x=X$ and $g^yY$. FIG 2 comprises, similarly to the apparatus shown in FIG. 1, a subtractor circuit 1 inputs 4 and 5 of which are coupled to the inputs 10 and 11 respectively, a Zech look-up table circuit 2 the input of which is coupled to the output 6 of the subtractor circuit 1, and an adder circuit 3 inputs 9 and 12 of which are coupled to the output 8 of look-up table circuit 2 and to the input 11 respectively and an output 13 of which is coupled to the output 14. However, the coupling between subtractor circuit output 6 and look-up table circuit input 7 is now via the input 24 and the output 25 of a converter circuit 15, and the coupling between input 11 and the input 12 of adder circuit 3 is now via one input 19 and the output 17 of a multiplexer circuit 18. The other input 16 of multiplexer 18 is coupled to the input 10. Multiplexer 18 couples its inputs 16 and 19 to its output 17 as alternatives under the control of a control signal applied to a control input 20 from the output 21 of a detector circuit 22. The input 23 of circuit 22 is coupled to the output 6 of subtractor circuit 1.

Similarly to their counterparts in the apparatus shown in FIG. 1, subtractor circuit 1 generates at its output 6 a representation modulo (p-1) of (x−y) and adder circuit 3 generates at its output 13 a representation modulo (p-1) of m+j, where m is a quantity (=y in FIG. 1) a residue representation modulo (p-1) of which is applied to its input 12. However, in contrast with FIG. 1, in FIG. 2 the quantity m is equal to either x or y, depending on the switching state of multiplexer 18. Moreover, the quantity k a residue representation modulo (p-1) of which is applied to input 7 of Zech look-up table circuit 2 and which in FIG. 1 is always (x−y), is in FIG. 2 equal either to (x−y) or to (y−x), due to the action of the converter circuit 15. Converter circuit !5 is arranged to convert each representation of at least one specific value of (x−y) generated by the subtractor circuit 1 to a representation modulo (p-1) of (y−x),- those representations which are not of the specific value(s) being transmitted by converter circuit 15 unchanged. Detector circuit 22 is arranged to detect when a representation generated by subtractor circuit 1 is of a said specific value and to control multiplexer 18 to couple its input 16 to its output 17 in response. multiplexer 18 being controlled to couple its input 19 to its output 17 otherwise. Provision of the converter circuit 15 and the multiplexer circuit 18 enables the size of the Zech look-up table circuit 15 which would otherwise be required to be reduced, as will now be explained.

Referring once again to the known apparatus of FIG. 1, for which it was pointed out that $g^i=g^{y+j}=g^yg^j=g^y(g^{x-y}+1)=g^x+g^y=X+Y$ as required, it will be noted that if the input quantities x and y were interchanged the corresponding expression would be $g^i = g^{x+j} = g^x g^j = g^x(g^{y-x}+1) = g^x + g^y$, which is again equal to $X+Y$ as required. Because $(g^{y-x}+1) = (g^{-(x-y)}+1)$ the consequence is that, in the apparatus of FIG. 1, the output $(x-y)$ of subtractor circuit 1 could, if desired, be converted to its negative modulo (p-1) prior to its application to the input 7 of Zech look-up table circuit 2, provided that the input quantity x was substituted for the input quantity y at the input 12 of adder circuit 3. This is what is achieved in the apparatus of FIG. 2 for some specific values of $(x-y)$.

It is a property of modulo (p-1) arithmetic that there is a unique direct mapping between positive and negative numbers, this mapping being as follows.

| | |
|---|---|
| −0 = | 0 |
| −1 = | p − 2 |
| −2 = | p − 3 |
| — | |
| — | |
| — | |
| −(p − 3) = | 2 |
| −(p − 2) = | 1 |

Thus, when specific values of $(x-y)$ are converted to their negatives by means of converter circuit 15 of FIG. 2, these negatives themselves directly map in turn to unique values which, for the most part, will be different from the specific values originally converted. Thus, with the apparatus of FIG. 2, the Zech look-up table circuit 2 need not contain entries corresponding to the said specific values of $(x-y)$, provided that it does contain entries corresponding to the unique values to which the negatives of the said specific values directly map. In fact a reduction in size of the Zech look-up table circuit 2 of approaching one half is made possible by the provision of the circuits 15, 18 and 22 in the apparatus of FIG. 2. If, for example, p=13 (as used for the example of the Zech table circuit 2 quoted in the preamble) then the converter circuit 15 may be arranged, for example, to produce the following relationship between the values of $(x-y)$ represented at its input 24 and the resulting values of k represented at its output 25.

| (x − y) | k |
|---|---|
| Nil | Nil |
| 0 | 0 |
| 1 | 1 |
| 2 | 2 |
| 3 | 3 |
| 4 | 4 |
| 5 | 5 |
| 6 | 6 |
| 7 | 5 |
| 8 | 4 |
| 9 | 3 |
| 10 | 2 |
| 11 | 1 |

(This is possible because −7=5 modulo 12, −8=4 modulo 12, etc.). The detector circuit 22 then has to be arranged to control multiplexer 18 to couple its input 16 to its output 17 for values of $(x-y)$ between 7 and 11, and to couple its input 19 to its output 17 otherwise, thereby ensuring that the value i represented at the output 14 is correct is all cases. The result is that Zech look-up table circuit Z no longer needs to contain entries corresponding to values of $(x-y)$ between 7 and 11. Of course, the choice of values of $(x-y)$ between 7 and 11 for conversion to their negatives is merely one of several possibilities; any other set of values, or even just one or two values, may be chosen as desired, provided always that for each value v chosen, the value p−1−v (being the value to which its negative uniquely maps) is not also chosen.

If, for example, subtractor 6 is arranged to generate each of the above-quoted values of $(x-y)$ as a logic "1" on a respective one of thirteen output lines, converter 15 may be formed as a set of eight through-connections, those ranking third to seventh including respective OR-gates second inputs of which are fed from respective further input lines ranking thirteenth to ninth. In such a case detector circuit 22 may be formed by a six-input further OR-gate five respective inputs of which are fed from respective ones of the further input lines and the remaining input of which is fed from the input 11 in such manner that a logic "1" is applied thereto when the input quantity y of the apparatus is "nil". Thus, for example, the said remaining input may be fed from the output of a further detector (not shown) for the presence of a representation of "nil" at the input 11 or, if the value of the input quantity y is arranged to be represented by a logic "1" on a respective one of thirteen input lines constituting the input 11, directly from the input line corresponding to "nil". The feeding of one input of the further OR-gate from the input 11 in this way (indicated in FIG. 2 by the dashed line 34) is provided because, when the value of the input quantity y of the apparatus of FIG. 2 is "nil" (this itself being a power representation of Y=0) the resulting output from adder 3 should be a quantity which is a power representation of X, i.e. x. Under these circumstances the output of subtractor 1 will be "nil" and that of look-up table 2 will be zero. Thus a representation of "nil" at input 11 should be arranged to result in the controlling of multiplexer 18 to connect its input 16 to its output 17, thereby ensuring that the input quantity x is transferred to the input 12 of adder 3 when y="nil". (As an alternative to arranging that multiplexer 18 responds to y='-'nil" in this way it is of course possible to provide a further multiplexer (not shown) having one signal input connected to input 10 and the other signal input connected to output 14, this multiplexer being controlled by the output signal of the said further detector or the line of input 11 corresponding to "nil", in such manner that it connects the one signal input to its output when y=nil and connects the other signal input to its output otherwise). Obviously, when $(x-y)$ has a value such that its negative maps to the same value, e.g. 0 and 6 when p−1=12, it does not matter which state multiplexer 18 is controlled to adopt.

If desired the apparatus described with reference to FIG. 2 may incorporate further features as described and claimed in co-pending application Ser. No. 7/345,391 filed May 1, 1989 ... (PHB 33452) of even in order that the representations of i will be generated at the output 14 of the apparatus in the form of i residue components modulo respective integers which are mutually prime and the product of which is equal to (p-1) and in order that the respresentations of x and y can be supplied to the inputs 10 and 11 of the apparatus each also in the form of n residue components modulo the same said respective integers. For full details of how this can be done reference may be made to the said co-pending application. Briefly, for the exemplary value of p=13 used in the description of FIG. 2, two such respective integers may be employed, i.e. four and three respectively, the subtractor circuit 1 then being constituted by a modulo 4 subtractor circuit and a modulo 3 subtractor circuit operating in parallel on the corresponding residue components of the quantities x and y and the adder circuit 3 similarly being constituted by a modulo 4 adder circuit and a modulo 3 adder circuit operating in parallel on the corresponding residue components of the quantities j and m. If this is the case the output quantity (x−y) of subtractor subcircuit 1 will also be in the form of two residue components modulo 4 and 3 respectively, and if for example subtractor circuit 1 is constructed to generate representations of values from 0 to 3 of the first of these in the form of logic "1" on output lines $0_4$, $1_4$, $2_4$ and $3_4$ respectively, and representations of values from 0 to 2 of the second of these as logic "1s' on output lines $0_3$, $1_3$ and $2_3$ respectively (FIG. 3) then converter circuit 15 and detector circuit 22 may be constructed, for example, as shown in FIG. 3, i.e. by means of six NAND-gates 26-31, one OR-gate 32 and one inverter 33 interconnected as shown. The output quantity for application to look-up table circuit 2 is represented by a logic "1" on one of the outputs $k0_3$, $k1_3$ and $k2_3$ in combination with a logic "1" on one of the outputs $k0_4$, $k1_4$ and $k2_4$. A value of three for the modulo 4 input residue component, represented by logic "1" on input line $3_4$, is converted to its negative by means of OR-gate 32 and appears as a logic "1" on output line $k1_4$. ($-3 \mod 4 = 1$). Each time this occurs NAND gates 26 and 29, which are otherwise enabled by the output signal of inverter 33, causing any logic "1" on input line $1_3$ or input line $2_3$ to be transferred to output line $k1_3$ or output line $k2_3$ respectively, are disabled. The result is that, instead, any logic "1" on input line $1_3$ is transferred to output line $k2_3$ and any logic "1" on input line $2_3$ is transferred to output line $k1_3$, i.e. any value of the modulo 3 input residue component represented by a logic "1" on one of the input lines $0_3$, $1_3$ and $2_3$ is converted to its negative represented by a logic "1" on one of the output lines $k0_3$, $k1_3$ and $k2_3$. ($-0 \mod 3 = 0$, $-1 \mod 3 = 2$ and $-2 \mod 3 = 1$). It will be noted that detector 2Z has in this simple example been replaced by a simple direct connection from input line $3_4$ to output 21, the signal applied to output 21 also being used to control the conversion of the modulo 3 input residue component to its negative when required. Construction of converter circuit 15 as shown in FIG. 3 makes it unnecessary for Zech look-up table 2 to contain entries corresponding to values of (x−y) of 3, 7 and 11.

The adder, subtractor and Zech look-up table circuits 1, 2 and 3 may, for example, each be formed by a suitably programmed read-only memory or by means of combinatorial logic circuitry.

It will be evident that many modifications to the embodiments described are possible within the scope of the invention as defined by the claims. In particular different, and usually larger, values of p may be employed. For example, a value of 31 may be chosen for p, in which case subtractor circuit 1 and adder circuit 3 may each be constituted by three parallel-operating subcircuits operating modulo Z, modulo 3 and modulo 5 respectively.

Although, as described, the same coding scheme is used for the quantities represented throughoutthe apparatus, it will be evident that this is not necessarily the case. For example, a one-out-of-N coding scheme may be used for the quantities x, y and i whereas the subtractor circuit 1, the look-up table 2 and the converter circuit 15 may be constructed to produce their outputs in the form of a conventional compact binary code, the look-up table 2, the detector circuit 22, and the adder circuit 3 being modified accordingly so as to respond in the desired manner to the compact binary codes used.

It will be evident that, because the processing takes place in the apparatus described in four distinct stages, i.e. subtraction, conversion/multiplexing, look-up and addition, so-called "pipelining" may readily be employed to optimise the processing throughput for a succession of input operands.

From reading the present disclosure, other modifications will be apparent to persons skilled in the art. Such modifications may involve other features which are already known in the design, manufacture and use of arithmetic apparatuses and component parts thereof and which may be used instead of or in addition to features already described herein. Although claims have been formulated in this application to particular combinations of features, it should be understood that the scope of the disclosure of the present application also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention. The applicants hereby give notice that new claims may be formulated to such features and/or combinations of such features during the prosecution of the present application or of any further application derived therefrom.

We claim:

1. Apparatus for generating a representation module p-1 of the power index i to which a generator g has to be raised to give the value X+Y in modulo p arithmetic in response to the application to said apparatus of representations modulo p-1 of x, where $g^x = X$, and y, were $g^y = Y$, which apparatus has first and second inputs for the representations of X and Y, respectively, and an output for the representation of i and comprises
  (a) a subtractor circuit, having
    (i) first and second inputs coupled to the first and second inputs, respectively, of the apparatus, and
    (ii) an output, at which the subtractor circuit generates a representation module p-1 of x−y,
  (b) a look-up table circuit having
    (i) an input coupled to the output of the subtractor circuit, and
    (ii) an output at which the look-up table circuit generates a representation modulo p-1 of the power index j to which g has to be raised to give the value $g^k + 1$ in modulo p arithmetic in response to the application to said input of a representation modulo p-1 of any member of a set of values k, and
  (c) an adder circuit having
    (i) first and second inputs to which are coupled the second input of the apparatus and the output of the look-up table circuit, respectively, and
    (ii) an output at which the adder generates a representation modulo p-1 of m+j in response to the application to the first and second inputs of the adder circuit of residue representations modulo p-1 of m and j, respectively, which output constitutes the output of the apparatus,
wherein the improvement comprises:
  (d) a multiplexer circuit having
    (i) a first multiplexer input, (ii) a second multiplexer input,
(iii) a control input, and
(iv) a multiplexer output, which multiplexer circuit, in response to a control signal to said control input, couples either the first multiplexer input to the multiplexer output or the second multiplexer input to the multiplexer output, the first multiplexer input being coupled to the first input of the apparatus and the coupling from the second input of the apparatus to the first input of the adder circuit being though said multiplexer circuit from the second multiplexer input to the multiplexer output, (e) a converter circuit, coupled between the output of the subtractor circuit and the input of the look-up table circuit, for converting each representation of at least one specific value x-y generated by the subtractor circuit to a representation modulo p-1 of y−x, and (f) means, coupled between the output of the subtractor circuit and the control input of the multiplexer circuit, for supplying a control signal to the multiplexer circuit to cause the multiplexer circuit to couple its first input to its output in response at least tot he presence at the subtractor circuit output of any representation which will be so converted by the converter circuit.

2. Apparatus as claimed in claim 1, including means for also controlling the multiplexer circuit to couple the first multiplexer input to the multiplexer output in response to the presence at the second input of the apparatus of a representation of a specific value of y corresponding to Y=O.

3. Apparatus for generating a representation modulo p-1 of the power index i to which a generator g has to be raised to give the value X+Y in modulo p arithmetic in response to the application to said apparatus of representations modulo p-1 of x, where $g^x = X$ and $y$ where $g^y = Y$, which apparatus comprises:

(a) a subtractor circuit for receiving the representations of x and y and generating a representation of x−y modulo p-1, (b) a converter circuit fed by said subtractor circuit for converting each representation of at least one specific value of x−y to the representation modulo p-1 of y−x but for transmitting all other values not so converted, (c) a look-up table fed by said converter circuit for under control of any converted or transmitted representation of x−y generating a representation modulo p-1 of the power index j to which g has to be raised to give the value $g^{k+1}$ in modulo p arithmetic in response to the application of a representation modulo p-1 of any member of a set of values of k, (d) a multiplexer having data inputs for receiving said representation of x and y, an control input coupled with the output of said subtractor circuit for either transmitting the representation of y or x, the multiplexer transmitting the representing of x at least when any converting operations occur in the converter circuit, and (e) an adder circuit fed by said look-up table and by said multiplexer for adding two received input quantities modulo p-1.

4. The apparatus of claim 3 further comprising a detector circuit coupled between the output of the subtractor circuit and the control input of the multiplexer circuit for controlling the multiplexer to choose either the representation of x or the representation of y based on whether a signal present at the output of the subtractor circuit represents a number within a predetermined range of values.

5. Apparatus as claimed in claim 4, wherein the detector circuit also controls the multiplexer circuit to transmit the representation of x in response to a representation of a specific value of y corresponding to y=O.

* * * * *